United States Patent
de Vries et al.

(10) Patent No.: US 10,751,723 B2
(45) Date of Patent: Aug. 25, 2020

(54) METHOD AND APPARATUS FOR LIBERATING PARTICLES FROM MOIST MSWI ASH

(71) Applicant: ADR Technology B.V., Delft (NL)

(72) Inventors: Walterus de Vries, Delft (NL); Johannes Gerardus Anna Bleijs, Delft (NL); Thijs Matthias Jacobus Bergmans, Delft (NL); Simon Petrus Maria Berkhout, Delft (NL); Peter Carlo Rem, Delft (NL)

(73) Assignee: ADR TECHNOLOGY B.V., Delft (NL)

( * ) Notice: Subject to any disclaimer, the term of this patent is extended or adjusted under 35 U.S.C. 154(b) by 230 days.

(21) Appl. No.: 15/498,135

(22) Filed: Apr. 26, 2017

(65) Prior Publication Data

US 2018/0311674 A1    Nov. 1, 2018

(51) Int. Cl.
| | |
|---|---|
| *B07B 13/10* | (2006.01) |
| *B02C 13/13* | (2006.01) |
| *B02C 13/06* | (2006.01) |
| *B02C 13/282* | (2006.01) |
| *B02C 23/10* | (2006.01) |

(Continued)

(52) U.S. Cl.
CPC ............ *B02C 13/13* (2013.01); *B02C 13/06* (2013.01); *B02C 13/282* (2013.01); *B02C 23/10* (2013.01); *B07B 13/10* (2013.01); *B07B 13/116* (2013.01); *B07B 13/16* (2013.01); *B02C 2013/28609* (2013.01); *B02C 2013/28636* (2013.01)

(58) Field of Classification Search
CPC ....... B07B 13/10; B07B 13/116; B07B 13/16; B07B 15/00; B02C 13/06; B02C 13/13; B02C 13/282; B02C 2013/28609; B02C 2013/28636
USPC .......................................... 209/631, 640, 930
See application file for complete search history.

(56) References Cited

U.S. PATENT DOCUMENTS

| | | | | |
|---|---|---|---|---|
| 3,756,401 A | * | 9/1973 | Rosner ...................... | B03B 9/06 209/39 |
| 3,757,946 A | * | 9/1973 | Berkowitz ................ | B03B 7/00 209/639 |

(Continued)

FOREIGN PATENT DOCUMENTS

| | | |
|---|---|---|
| DE | 9419488 U1 | 3/1995 |
| DE | 20218820 U1 | 4/2003 |

(Continued)

*Primary Examiner* — Joseph C Rodriguez
(74) *Attorney, Agent, or Firm* — Adsero IP

(57) ABSTRACT

A method and related apparatus for liberating particles with specific dimensions from a moist Municipal Solid Waste Incinerator ash (MSWI ash) material comprising particles with differing dimensions. In an aspect, the method comprises feeding an amount of the material in a particle stream, striking the particle stream with a striking body to impart a sudden change in direction of the particle stream, receiving at least a part of the stricken particle stream on a moving surface, and transporting the received particle stream to an outlet beyond the receiving area where the particle stream is divided in a first fraction rich of particles of a first group of particle dimensions, and at least a second fraction rich of particles of a second group of particle dimensions, which second fraction is substantially depleted of particles of the first group of particle dimensions.

19 Claims, 1 Drawing Sheet

(51) Int. Cl.
*B07B 13/11* (2006.01)
*B07B 13/16* (2006.01)
*B02C 13/286* (2006.01)

(56) References Cited

U.S. PATENT DOCUMENTS

| | | | | |
|---|---|---|---|---|
| 5,271,506 A * | 12/1993 | Haines | ............... | B07B 13/10 |
| | | | | 209/637 |
| 5,301,816 A * | 4/1994 | Weber | ............... | B03B 9/061 |
| | | | | 209/616 |
| 5,931,309 A * | 8/1999 | Andersson | ............ | B03C 1/22 |
| | | | | 209/215 |
| 6,068,133 A * | 5/2000 | Schonfeld | ............ | B03C 1/247 |
| | | | | 209/212 |
| 7,367,457 B2 * | 5/2008 | Warlitz | ............... | B03C 1/14 |
| | | | | 209/225 |
| 8,905,242 B2 * | 12/2014 | Vandemierden | ...... | B03B 9/04 |
| | | | | 209/12.1 |
| 9,033,157 B2 * | 5/2015 | Berkhout | ............ | B07B 13/10 |
| | | | | 209/644 |
| 9,199,280 B2 * | 12/2015 | Viny | ..................... | B07B 4/04 |
| 9,409,210 B2 * | 8/2016 | Berkhout | ............ | B07B 13/10 |
| 2015/0108047 A1 * | 4/2015 | Rem | ..................... | B03C 1/247 |
| | | | | 209/555 |

FOREIGN PATENT DOCUMENTS

| | | | |
|---|---|---|---|
| WO | WO 2004/082839 | A1 | 9/2004 |
| WO | WO 2012/015299 | A1 | 2/2013 |
| WO | WO 2015/128753 | A1 | 9/2015 |

* cited by examiner

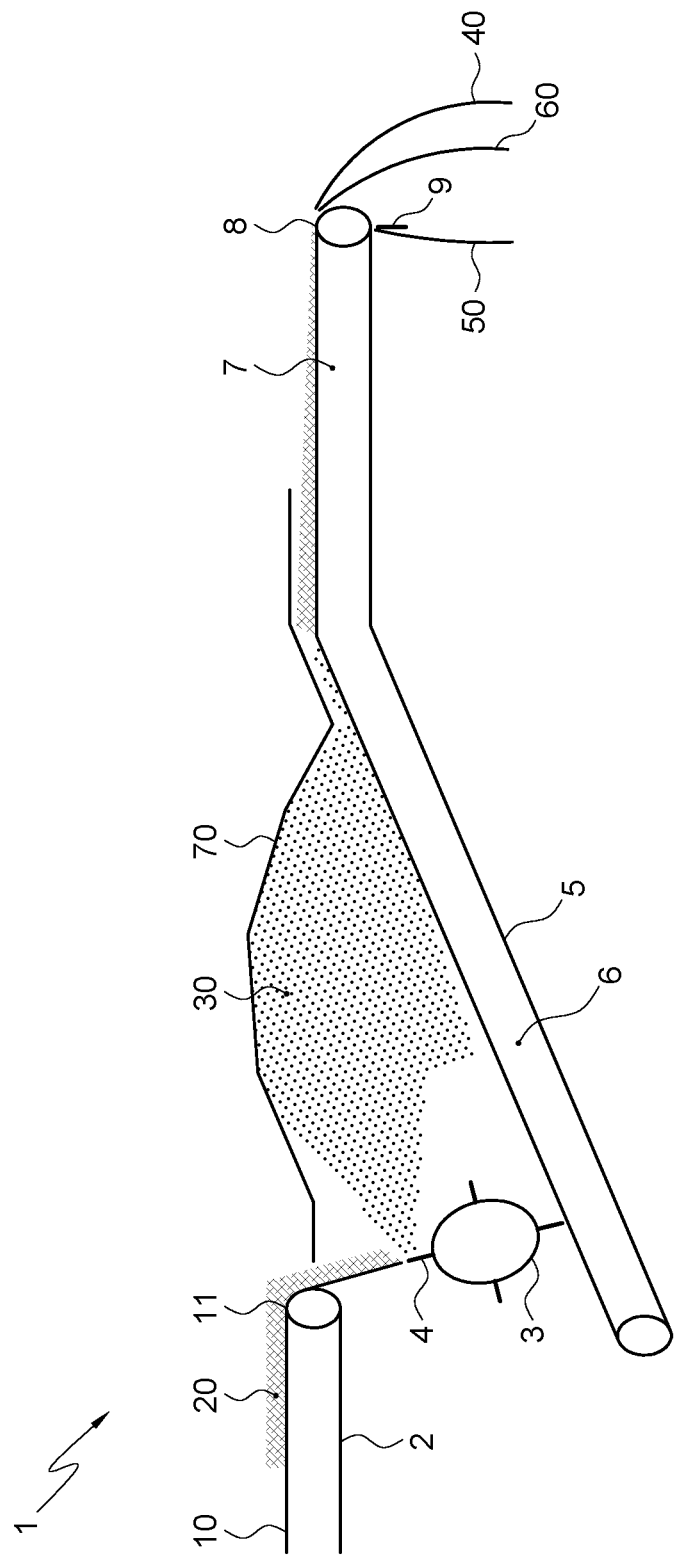

US 10,751,723 B2

METHOD AND APPARATUS FOR LIBERATING PARTICLES FROM MOIST MSWI ASH

FIELD

Certain embodiments of the invention relate to a method and apparatus for liberating particles with specific dimensions from a moist Municipal Solid Waste Incinerator ash (MSWI ash) material comprising particles with differing dimensions.

BACKGROUND

Worldwide hundreds of millions of tons of Municipal Solid Waste (MSW) are produced every year. One of the most common techniques to deal with such amounts of waste is incineration, as this reduces waste mass and volume while providing recovery of energy from the waste to generate electricity. Although the process of Municipal Solid Waste Incineration (MSWI) is a convenient means for reducing the mass and volume of MSW, this process does lead to still significant amounts of ash as the by-product that is produced during the combustion of municipal solid waste in combustor facilities. The ashes from MSWI may be disposed as landfill. However, in most developed countries, where land is scarce and environmental controls are tight, recycling and reusing of waste ashes is preferred over landfill disposals.

An important aspect of the recycling and reuse of MSWI ashes is that the ash material may vary, particularly because the composition of municipal solid waste varies over time and from country to country, due to differences in regulations, lifestyle and waste treatment processes. The properties of MSWI ashes can be divided into two groups: physical properties, such as particle size distribution, moisture content, bulk density, compressive strength, permeability and porosity, and chemical properties, such as chemical composition, loss on ignition, heavy metals and leachability, organic constituents and chloride content. Generally, the chemical and physical composition of ash will depend on the compositions of the raw MSW feed, the operational conditions, the type of incinerator and air pollution control system design.

In most modern mass burn solid waste combustors, several individual ash streams are produced. They include grate ash, siftings, boiler ash, scrubber ash and precipitator or baghouse ash. The term bottom ash is commonly used to refer to the grate ash, siftings and, in some cases, the boiler ash stream. Approximately 90 percent of the bottom ash stream consists of grate ash, which is the ash fraction that remains on the stoker or grate at the completion of the combustion cycle. It contains small amounts of unburnt organic material and chunks of metal. The grate ash stream consists primarily of glass, ceramics, ferrous and nonferrous metals, and mineralic slags. It comprises approximately 75 to 80 percent of the total combined ash stream.

The term fly ash is used to refer to the ash collected in the air pollution control system, which includes the scrubber ash and precipitator or baghouse ash. The baghouse or precipitator ash comprises approximately 10 to 15 percent of the total combined ash stream. This material includes many so-called fines, i.e., particles with a diameter of less than 1 mm, e.g., 100 micrometer. In Europe, most combustor facilities separate the bottom ash and fly ash streams. As the bottom ash constitutes the largest volume, approximately 75 to 80 percent, of the total amount of ash material after MSWI, methods and apparatus have been developed to recycle and reuse these ashes.

Typically, the ash material after MSWI is moist, and includes a mix of metal, glass and mineral particles of various sizes. The MSWI ash includes many fines, as described above. The presence of moisture and fines causes water bonds (H bonds) between particles of different material, so that smaller agglomerated particles are formed. Due to these agglomerations, it is difficult to separate and retrieve the particles of different materials from the moist MSWI ash without washing or drying steps, which are costly, time consuming and environmentally less friendly.

BRIEF DESCRIPTION OF THE DRAWINGS

FIG. 1 shows an embodiment of an apparatus for liberating particles according to various embodiments.

DETAILED DESCRIPTION

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Published international applications WO2012015299 and WO2015128753, both of which are hereby incorporated by reference, describe a ballistic separator to break up the agglomerated particles and to classify the particles of a smaller diameter particle stream into two size fractions.

The systems described in these documents employ a feed device, or feeder, for feeding an amount of the moist bottom ash material sieved to a maximum diameter of e.g. 20 or 40 mm in a falling particle stream, a striking body having a striking surface for striking the particle stream towards a receiving area, and two receiving bodies, each with a movable surface in the receiving area for receiving at least part of the particle stream thereon. The striking of the particle stream results in a breaking up of agglomerated particles and classification of particles into two groups, each to be received on a separate moving body. A stream fraction with smaller particles will be received on the movable surface of a receiving body in the receiving area that is closer to the striking body, while a stream fraction with larger particles will be received on the movable surface of a receiving body in the receiving area that is further away from the striking body. The different fractions are collected separately for further recycling or reuse by positioning a first and second conveyor belt at the different distances from the striking body. The known apparatus and method is e.g. used for separation of particles of rather small dimensions, less than 2 millimeter (mm) diameter, from a pre-sieved bottom ash stream comprising particles varying in dimensions between 0-15 mm in diameter.

In order to allow for precise classification, the particle stream should not include particles of too large a diameter, and the thickness and trajectory of the falling particle stream in the feed should be controlled.

A MSWI ash stream comprising particles varying in dimensions between 0 and 15 mm in diameter may be relatively easily obtained from European bottom ash by pre-sieving the material using a 15 mm sieve. The techniques described in the documents mentioned above are thus particularly suited for processing bottom ash material derived from European solid waste combustor facilities.

The ash material produced elsewhere after MSWI may differ, however. For instance, in the United States of America, typically all of the ash streams, i.e. bottom ash and fly ash, are combined. This combined stream is referred to as combined ash. The combined ash significantly differs from the European bottom ash in constitution and is particularly more cohesive when moist, particularly due to a higher amount of fines in the ash. Also, in the United States of America, typically lime is added to the MSWI ash, which increases the amount of fines in the ash. Accordingly the combined ash tends to form larger clumps, particularly when moist, as compared to the European bottom ash. These clumps render the material largely unsuitable for direct processing by the techniques described above. In particular, economic sieving of the material to decrease the maximum particle size even to 40 mm is not possible. In particles, the maximum particle size generally cannot be reduced to less than 50, 60, 80 or even 100 mm. This problem of the ash forming larger clumps also appears in some other non-European bottom ashes. For example, ash that has not been aged and comprises an amount of moisture between 18-35% by weight, comprises an amount of fly ash between 10-15% by weight, and/or comprises an amount of lime between 1-5% by weight is not suitable for processing using these techniques, as it cannot be pre-processed using conventional screening.

Certain embodiments, therefore, provide an apparatus and a method in which the ash material after MSWI can be pre-processed for recycling or reuse independently from the particular ash composition, and in particular for pre-processing moist bottom ash material or moist combined ash comprising particles with differing dimensions. As this disclosure generally relates to the processing of all the different kinds of ashes after MSWI, the term "MSWI ash" is hereinafter used for all these ashes including both the typical bottom ash as for instance used in Europe as well as the combined ash as e.g. used in the United States.

In an aspect, certain embodiments provide for a method of liberating particles with specific dimensions from a moist Municipal Solid Waste Incinerator ash (MSWI ash) material, including particles with differing dimensions. One such method might comprise feeding with a feeder an amount of the material in a particle stream, striking the particle stream with a striking surface of a striking body to impart a sudden change in direction of the particle stream, receiving at least a part of the stricken particle stream on a moving surface of a receiving area, and/or transporting the received particle stream to an outlet beyond the receiving area; at this point, the particle stream can be divided into a first particle stream fraction rich of particles of a first group of particle dimensions, and at least a second particle stream fraction rich of particles of a second group of particle dimensions, which second particle stream fraction is substantially depleted of particles of the first group of particle dimensions.

By striking the particle stream, clumps in the MSWI ash can be broken up and by receiving and transporting the stricken particles on a moving surface to an outlet the particles remain in a liberated condition so that they can be divided into different size fractions at the outlet of the moving surface relatively easily.

In some aspects, the striking is used to process a lower diameter MSWI ash fraction that cannot economically be sieved to maximum diameter that is sufficient for precise classification. As an alternative to sieving, the striking is applied for liberation, and classification of the particles can take place in a subsequent processing step. The particle stream received at the receiving area is thus relatively divergent in diameter.

The resulting particles comprise coarse particles of a first group of particle dimensions and finer particles of a second group of particle dimensions, which particles after the breakup are received on the moving surface in the receiving area. The finer particles of the second group of particle dimensions are relatively adhesive to the moving surface, whereas the coarse particles of the first group of particle dimensions lie more freely on the surface and may as such be discharged from the moving surface. A first fraction of the particle stream comprising the coarse particles may accordingly be obtained separately from a second fraction of the particle stream comprising the finer particles.

As the finer particles, i.e. adhesive fines, are largely removed from the first fraction, rendering the first fraction less cohesive and drier, this first fraction is more suitable for classifying of the material in a subsequent processing step. The further classifying may for instance involve conventional screening processes. The second group thus contains a higher proportion of finer, small diameter particles than the first group, and the first group thus contains a higher proportion of more coarse, larger diameter particles than the second group.

The first group of particle dimensions may e.g. include particles having a diameter of at least 20, 30 or 40 mm, and e.g. up to 60, 80 or 100 mm. The second group of particle dimensions may e.g. include particles having a diameter of less than 10, 2 or 1 mm.

The infeed may comprise 20-40 mass percent of fines having 0 to 1 mm diameter, and at the receiving area the particles may e.g. comprise at least 40%, alternatively at least 50% or at least 60% or even up to 100% of the mass of the particles less than 1 mm diameter that were in the infeed. The particle stream received at the receiving area particle may include at least 15%, alternatively at least 20% or at least 30% by mass of particles of less than 1 mm diameter. Also, the particle stream in the infeed and/or received at the receiving area may include particles of at least 40 mm diameter, preferably at least 50 mm or 60 mm. Typically, the particle stream in the infeed has been preprocessed, e.g. sieved, to include particles from 0 mm diameter up to a maximum dimension of e.g. 100 mm diameter. The minimum diameter of the particles of the MSWI ash material in the infeed and/or the receiving area may be 100 micrometer or less.

By receiving a substantial part of the stricken particle stream, substantially the whole stricken particle stream may be received on the moving surface of a receiving area. The moving surface of the receiving area may advantageously comprise a single moving surface. Substantially in this context means e.g. 70, 80 or 90% or preferably the complete particle stream, minus any processing losses.

Another part of the stricken particle stream, i.e. the remaining part, may however be collected in another receiving area, e.g. a further receiving area that is located closer to striking body than the main receiving area. Such further receiving area may be a further moving surface, a bin or a hopper. Such other part of the stricken particle stream may also be also rich of particles of the second group of dimensions compared to the first particle stream fraction.

The striking body may preferably be a ballistic separator, in particular a rotating drum with hitting plates.

The first fraction may be discharged at the outlet from the moving surface, and the at least second fraction may be substantially maintained on the moving surface. The discharge of the particles may take place due to inertia, while maintenance on the moving surface may take place due to adhesion, in particular due to forming of water bonds between the fine particles and the moving surface. The presence of a high percentage of fines in the stricken stream received at the moving body thus aids in separation.

The first particle stream fraction may be collected at a first distance from the outlet, and the at least second particle stream fraction may be collected nearer to the outlet, and particularly might be at least partly collected from the moving surface at the outlet, e.g. using a scraper.

The striking body may impact the particles with a speed of at least 10 m/s, and is preferably a speed between 10 m/s and 20 m/s.

The striking body may impart a stepwise change of direction onto freefalling particles of the feed, in particular by adding a substantially horizontal component to the particle speed. The striking body may thus impart an instantaneous, high acceleration that causes the H bonds to break.

The moving surface of the receiving area may move with a speed of at least 1.5 m/s to prevent re-agglomeration due to particles falling on top of each other, and in some cases moves at a speed between 1.5 and 5 m/s. An advantage of the mentioned higher limit of the moving speed of the conveyor is that, at the end of the conveyor, the particles of the first fraction which are less hindered by adhesion to the moving surface than the particles of the second fraction, may be discharged along a ballistic course to a location distant from the conveyor whereas the particles of the second fraction simply fall off the conveyor end or even stick to it. This effect therefore contributes tremendously to the separation efficiency. In some circumstances, it has been found that best results are achieved when the surface of the conveyor moves at a speed of 4 m/s.

The MSWI ash that can be processed by the present invention may e.g. comprises an amount of moisture between 18-35% by weight, and/or comprises an amount of fly ash between 10-15% by weight, and/or comprises an amount of lime between 1-5% by weight.

The particle stream may be divided into the first fraction, the second particle stream fraction and at least a third particle stream fraction. The first particle stream fraction may be discharged from the moving surface at a first distance from the outlet, the second particle fraction may be collected from the moving surface, and the at least third particle fraction may be discharged from the moving surface at a second distance from the outlet, the second distance being nearer to the outlet than the first distance.

The method may comprising pre-processing the MSWI ash material with a method of liberating particles as discussed, obtaining the first and second particle stream fraction, and processing the first particle stream and/or second particle stream fraction in a classifying apparatus. Such classifying apparatus may include a ballistic separator to classify the particle fractions, as discussed in the earlier-referenced publications WO2012015299 and WO2015128753. As an alternative, a sieving operation or concentration operation may be performed. It is noted that also the other part of the stricken particles stream that is collected in another receiving area may be processed in such a classifying apparatus.

Some embodiments of the invention also can provide an apparatus for liberating particles from a moist MSWI ash material having particles with differing dimensions. An exemplary apparatus might comprise a feeder for feeding an amount of the moist MSWI ash material in a particle stream to a striking body, the striking body having a striking surface for striking the particle stream towards a receiving area, and a receiving body in a receiving area having a movable surface in the receiving area for receiving at least a part of the stricken particle stream thereon, wherein the receiving body includes an outlet beyond the receiving area where the particle stream is divided in a first particle stream fraction rich of particles of a first group of particle dimensions and at least a second particle stream fraction rich of particles of a second group of particle dimensions, which second particle stream fraction is substantially depleted of particles of the first group of particle dimensions, the apparatus further including a first collection area located further away from the outlet to which the first particle stream is discharged and a second collection area that that is located more closely to the outlet to which the second particle stream is discharged. The separation at the outlet and the provision of the collection area allows the first and second particle streams to be separate, so that agglomeration of particles in the first particle stream may be reduced.

The outlet may e.g. comprise a splitter, including without limitation a rotating splitter, to divide the particle stream into the first particle stream fraction rich of particles of a first group of particle dimensions and the least second particle stream fraction rich of particles of a second group of particle dimensions.

The receiving body may e.g. comprise a conveyor belt as movable surface. The receiving body may be configured to receive substantially the whole stricken particle stream on its moving surface, and is preferably configured as a single conveyor. The conveyor may be configured to move at a speed of at least 1.5 m/s, preferably between 1.5 m/s and 5 m/s. The movable surface may comprise a horizontal or declining end section near the outlet, so as to facilitate separation at the outlet. The striking body may comprise a rotatable drum having at its circumference at least one hitting surface extending therefrom for the particles. The drum may be configured to rotate at a speed suitable for breaking up clumps present in the particle stream for liberating particles, and may e.g. include substantially radially extending hitting plates as striking body. The striking body may be configured to rotate at a speed of at least 10 m/s, and in some cases between 10-20 m/s.

In some embodiments, a scraper is provided at the conveyor's outlet for removal of particles of the at least second fraction that stick to the surface of the conveyor. This material of the at least second fraction that is scraped off the surface of the conveyor is of course preferably separately collected from the material that is discharged from the conveyor and which is collected distant from the conveyor's outlet. The removal of the at least second fraction from the conveyor belt by the scraper additionally cleans the moving surface, which is helpful for an efficient separation by adhesion of the at least second fraction to the belt, which can help prevent clustering of the particles from the first and second fraction of the particle stream on the moving surface.

A further embodiment is characterized in that the conveyor belt is configured to be free of adhesive particles before entering the receiving area of the particle flow. Removal of adhesive material from the moving surface prior to entering the receiving area can render the separation of the fractions at the discharge point of the moving surface substantially more effective.

In a further embodiment, the device might comprise an enclosing surface above the striking body and the moving surface, which enclosing surface is arranged in such a way that an angle of this enclosing surface with respect to a center of the striking body, when hitting the fed particle stream, is smaller than 25 degrees, and particularly smaller than 22 degrees. In some cases, such an angle can prevent the particle stream from impacting this enclosing surface in such a way that pollution will adhere to the surface which, as noted above, can eventually hinder the separation.

In another embodiment at least a first section of the belt nearest to the striking body is inclined up to about 15 degrees upwards relative to the horizontal. At this angle, the flow of particles on the moving surface can stratify, resulting in fine particles being close to the surface, enabling them to have a cohesion to the surface which will enable classification at a discharge point or outlet. A smaller angle can have less stratification effect, while a higher angle might result in a part of the particles not being able to be transported with the surface because of rolling back (downwards) of the particles. Furthermore, if an enclosure is provided above the moving surface, the inclination of the belt towards such enclosure may constrain size of the enclosure that can be used, as compared to a horizontal belt.

In a particular embodiment, the conveyor belt comprises a horizontal end section near the outlet. The horizontal section at the end of the conveyor belt can act to stabilize the particle stream layer on the belt in said section by reducing or preventing a bouncing of some of the particles, particularly the particles of the first fraction, on the moving belt. Accordingly, particles that are discharged from the belt at the outlet are discharged with an approximately uniform direction and speed, resulting in a good and reliable separation result based on the size and mass of the particles. An end section that extends with a downward component may also be used.

A further particular embodiment is characterized in that the striking body comprises a rotatable drum having at its circumference at least one plate having a radially extending hitting surface for the particles, the drum configured to rotate at a speed suitable for breaking clumps in the particle stream. Such a drum is found to be very suitable for effectively breaking up the clumps present in MSWI ash that has not been aged and comprises an amount of moisture between 18-35% by weight, and/or comprises an amount of fly ash between 10-15% by weight, and/or comprises an amount of lime between 1-5% by weight, such as United States combined ash, whereas it demonstrates acceptable minor wear.

Certain embodiments are well suited for use to concentrate metals or metal particles from said ashes into the first fraction. In some embodiments, the first fraction can be further processed with a dry separation method to separate the metals from this fraction further into ferrous and non-ferrous metals. This is possible due to the circumstance that during pre-processing of the particle stream, e.g., as described above, it has been shown that the first fraction has already lost much of the fines and its water content. Similarly, such embodiments are also very suited for use to concentrate minerals into the first fraction, and to make them suitable for further concentration.

These and other aspects of various embodiments are hereinafter further elucidated by the appended drawing which is described hereinafter and which forms part of the present application. The drawing is not in any way meant to reflect a limitation of the scope of the invention, unless this is clearly and explicitly indicated. In the drawing, FIG. 1 shows an embodiment of the apparatus for liberating particles according to some embodiments of the invention.

The apparatus 1 comprises an infeed device 2 for feeding an amount of a moist MSWI ash material comprising particles with differing dimensions, particularly a material stream that has been sieved to include particles between 0-60 mm, in a particle stream 20 towards a striking body 3 of the apparatus. To this end, the infeed device 2 comprises a conveyor belt 10, which moves with a speed that supports the development of an approximate monolayer-type particle stream on the conveyor. The conveyor belt 10 comprises an edge 11 beyond which the particle stream 20 falls from the conveyor belt 10 towards the striking body 3.

The striking body 3 comprises a rotating drum, which has at its circumference extending plates, which provide a striking surface 4 for striking the particle stream 20 in the vicinity of the drum 3. This construction of feeding device 2 and striking body 3 is arranged such that the plates 4 impinge on the particle stream 20. This is shown in FIG. 1 with respect to plate 4.

In use, the drum 3 is caused to rotate at a speed such that the plates 4 impinge on the particles in the particle stream 20 with a horizontal speed in the range 10-17 m/s. Due to this action, a cloud of particles from the particle stream moves in the direction of a single receiving body 5 of the apparatus and is received on a single moving surface thereof. To this end, the receiving body 5 comprises a moving conveyor belt. The whole particle stream is received in a receiving area on a clean, i.e., substantially free of particles, moving surface of the receiving body 5. Because of the striking body striking the particle stream, large clumps formed in the cohesive ash material are broken up, thereby liberating smaller particles from the larger clumps. The resulting liberated particles comprise coarse particles of a first group of particle dimensions and finer particles of a second group of particle dimensions, which particles after the breakup are received on the moving surface in the receiving area. The finer particles of the second group of particle dimensions are relatively adhesive to the moving surface, whereas the coarse particles of the first group of particle dimensions lie more freely on the surface and may as such be discharged from the moving surface. Accordingly a first fraction of the particle stream comprising the coarse particles may be obtained separately from a second fraction of the particle stream comprising the finer particles.

For a good, reliable and easy separation between the fractions, the belt 5 might be arranged to move at a speed of 3 m/s. Additionally the belt 5 has a first section 6, which, in the illustrated embodiment, is inclined upwards with an angle of approximately 15 degrees to the horizontal at which angle the flow of particles on the moving surface will cause a suitable stratification of the particle material. An end section 7 of the belt is horizontal, which stabilizes the particle stream layer on the belt in said section by reducing or preventing a bouncing of particularly the particles of the first fraction on the moving belt. Accordingly particles that are discharged from the belt at an outlet 8 of the belt are all discharged with an approximately uniform direction and speed, resulting in a good and reliable separation result based on the size and mass of the particles. As such, the apparatus is suitable for dividing the particle stream received on the belt 5 in a first fraction 40 at a first collection area, a second particle stream fraction 50 at a second collection area and at least a third particle stream fraction 60 at a third collection area.

The first particle stream fraction 40 is discharged from the moving surface at a first distance from the outlet and comprises particles of a group with particle diameter dimensions between 15-60 mm. This first particle stream fraction 40 may be further processed with conventional screening methods in order to recycle therefrom coarse particles, such as mineral and metal particles. The second particle fraction 50 adheres to the belt surface and is collected beyond the outlet from the moving surface using a scraper 9. The second particle fraction 50 comprises very fine particles, or fines, of a group of particle dimensions between 0-1 mm. This fraction may be discarded. The at least third particle fraction 60 is discharged from the moving surface at a second distance from the outlet, the second distance being nearer to the outlet than the first distance. This at least third particle fraction 60 comprises particles of a group of particle dimensions between 1-15 mm and may be further processed with a method of ballistic classification.

In some embodiments, the apparatus 1 is further provided with a housing 70 in order to protect the particle stream and particle cloud after striking from outside weather conditions. As is shown in FIG. 1 the housing 70 comprises an enclosing surface, or roof, above the striking body and the moving surface. The enclosing surface 70 is arranged in such a way that an angle of this enclosing surface with respect to a center of the striking body, when hitting the fed particle stream, is generally smaller than 25 degrees, and particularly smaller than 22 degrees. Hence, several sections of the enclosing surface 70 are angled with respect to each other, depending on a distance of the section to the striking body. With higher angles, the particle stream might have an impact with this enclosing surface in such a way that pollution will adhere to the surface which will eventually hinder the separation.

For the purpose of clarity and a concise description, features are described herein as part of the same or separate aspects and preferred embodiments thereof, however, it will be appreciated that the scope of the invention may include embodiments having combinations of all or some of the features described.

What is claimed is:

1. A method of liberating particles with specific dimensions from a moist Municipal Solid Waste Incinerator (MSWI) ash material, the method comprising:
   providing particles with differing dimensions;
   feeding, with a feeder, an amount of the MSWI ash material comprising the particles in a particle stream;
   striking the particle stream with a striking surface of a striking body to impart a sudden change in direction of the particle stream;
   after striking the particle stream, receiving substantially a whole of the particle stream on a single moving surface of a receiving area; and
   transporting substantially the whole of the particle stream received at the receiving area to an outlet beyond the receiving area where substantially the whole of the particle stream is divided into a first particle stream fraction rich of particles of a first group of particle dimensions, and at least a second particle stream fraction rich of particles of a second group of particle dimensions, wherein the second particle stream fraction is substantially depleted of particles of the first group of particle dimensions,
   wherein the single moving surface comprises a first section located nearest to the striking body and a second section located nearest to the outlet, wherein the first section of the single moving surface is inclined upward, and wherein the second section of the single moving surface is at least one of horizontal or sloped downward.

2. The method of liberating particles according to claim 1, wherein substantially the whole of the particle stream received at the receiving area includes particles of at least 40 mm diameter.

3. The method of liberating particles according to claim 1, wherein substantially the whole of the particle stream received at the receiving area includes at least 40% of the mass of the particles less than 1 mm diameter that were in the feeder.

4. The method of liberating particles according to claim 1, wherein substantially the whole of the particle stream received at the receiving area includes at least 15% by mass of particles of less than 1 mm diameter.

5. The method of liberating particles according to claim 1, wherein the second particle stream fraction comprises more fines and is more moist than the first particle stream fraction.

6. The method of liberating particles according to claim 1, wherein the first particle stream fraction is discharged at the outlet from the single moving surface, and the at least second particle stream fraction is substantially maintained on the single moving surface.

7. The method of liberating particles according to claim 1, wherein the striking body impacts the particles with a speed of at least 10 m/s.

8. The method of liberating particles according to claim 1, wherein the striking body imparts a stepwise change of direction onto freefalling particles of the feed by adding a substantially horizontal component to the particle speed.

9. The method of liberating particles according to claim 1, wherein the single moving surface of the receiving area moves with a speed of at least 1.5 m/s.

10. The method of liberating particles according to claim 1, wherein the first particle stream fraction is collected at a first distance from the outlet, and the at least second particle stream fraction is collected nearer to the outlet, and is at least partly collected from the single moving surface at the outlet.

11. The method of liberating particles according to claim 1, wherein substantially the whole of the particle stream is divided in the first particle stream fraction, the second particle stream fraction and at least a third particle stream fraction, wherein the first particle stream fraction is discharged from the single moving surface at a first distance from the outlet, wherein the second particle stream fraction is collected from the single moving surface, and wherein the at least third particle stream fraction is discharged from the single moving surface at a second distance from the outlet, the second distance being nearer to the outlet than the first distance.

12. The method of claim 1, further comprising:
    obtaining the first and second particle stream fraction; and processing the first particle stream fraction and/or second particle stream fraction in a classifying apparatus.

13. An apparatus for liberating particles from a moist MSWI ash material having particles with differing dimensions, the apparatus comprising:
   a feeder and a striking body, the feeder for feeding an amount of the moist MSWI ash material in a particle stream to the striking body, the striking body comprising a rotating drum having at least one hitting surface extending radially from an outer surface of the rotating drum, wherein the rotating drum comprising the at least one hitting surface strikes the particle stream towards a receiving area;
   a receiving body in a receiving area having a single movable surface in the receiving area for receiving substantially a whole of the particle stream on the single movable surface of the receiving body after the particle stream has been struck by the striking body, wherein the receiving body includes an outlet beyond the receiving area where substantially the whole of the particle stream is divided into a first particle stream fraction rich of particles of a first group of particle dimensions and at least a second particle stream fraction rich of particles of a second group of particle dimensions, wherein the second particle stream fraction is substantially depleted of particles of the first group of particle dimensions, wherein the single movable surface comprises a first section located nearest to the striking body and a second section located nearest to the outlet, wherein the first section of the of the single movable surface is inclined upward to about 15 degrees relative to horizontal, and wherein the second section of the single movable surface is at least one of horizontal or sloped downward;
   a first collection area located further away from the outlet to which the first particle stream is discharged; and
   a second collection area that that is located more closely to the outlet to which the second particle stream is discharged.

14. The apparatus according to claim 13, wherein the receiving body comprises a conveyor belt as the single movable surface.

15. The apparatus according to claim 13, wherein the receiving body is configured as a single conveyor.

16. The apparatus according to claim 14, wherein the conveyor belt is configured to move at a speed of at least 1.5 m/s.

17. The apparatus according to claim 13, wherein the rotatable drum is configured to rotate at a speed suitable for breaking up clumps present in the particle stream for liberating particles.

18. The apparatus according to claim 13, wherein the striking body is configured to rotate at a speed of at least 10 m/s.

19. The apparatus according to claim 13, wherein the outlet comprises a splitter, to divide substantially the whole of the particle stream into the first particle stream fraction rich of particles of the first group of particle dimensions and the least second particle stream fraction rich of particles of the second group of particle dimensions.

* * * * *